(12) United States Patent
Hahn et al.

(10) Patent No.: US 9,199,728 B2
(45) Date of Patent: Dec. 1, 2015

(54) CONTROL DEVICE FOR AIRCRAFT

(75) Inventors: Klaus-Uwe Hahn, Wendeburg (DE); Ute Marita Meissner, Cologne (DE)

(73) Assignees: Deutches Zentrum fuer Luft—und Raumfahrt e.V., Cologne (DE); Ute Marita Meissner, Cologne (DE)

( * ) Notice: Subject to any disclaimer, the term of this patent is extended or adjusted under 35 U.S.C. 154(b) by 301 days.

(21) Appl. No.: 13/518,198

(22) PCT Filed: Dec. 21, 2010

(86) PCT No.: PCT/EP2010/007809
§ 371 (c)(1),
(2), (4) Date: Aug. 9, 2012

(87) PCT Pub. No.: WO2011/079923
PCT Pub. Date: Jul. 7, 2011

(65) Prior Publication Data
US 2012/0305704 A1 Dec. 6, 2012

(30) Foreign Application Priority Data
Dec. 23, 2009 (DE) .......................... 10 2009 060 561

(51) Int. Cl.
*B64C 25/50* (2006.01)
*B60T 7/18* (2006.01)
*B60T 8/17* (2006.01)

(52) U.S. Cl.
CPC . *B64C 25/50* (2013.01); *B60T 7/18* (2013.01); *B60T 8/1703* (2013.01)

(58) Field of Classification Search
CPC .......... B64C 25/50; G08G 5/025; B60T 7/18; B60T 8/1703
USPC ............................ 244/103 W, 100 R, 202, 50
See application file for complete search history.

(56) References Cited

U.S. PATENT DOCUMENTS

| | | | | |
|---|---|---|---|---|
| 1,844,186 A | * | 2/1932 | Short | 244/100 R |
| 2,222,850 A | * | 11/1940 | Maclaren | 244/100 R |
| 2,502,522 A | * | 4/1950 | Hoobler | 244/50 |
| 2,504,077 A | | 4/1950 | Loudenslager | |
| 2,538,388 A | * | 1/1951 | Sievers | 244/50 |
| 2,626,116 A | | 1/1953 | Steuby | |
| 3,516,625 A | * | 6/1970 | Houser et al. | 244/50 |
| 4,940,197 A | * | 7/1990 | Putnam | 244/102 R |
| 5,242,131 A | * | 9/1993 | Watts | 244/103 W |

(Continued)

FOREIGN PATENT DOCUMENTS

FR 896604 B1 2/1945

*Primary Examiner* — Christopher P Ellis
*Assistant Examiner* — Jessica Wong
(74) *Attorney, Agent, or Firm* — Whitham, Curtis, Christofferson & Cook PC; Michael Whitham; Timothy Miller

(57) ABSTRACT

A control device is provided for an aircraft, the aircraft having at least one undercarriage with one or more undercarriage wheels. A control mechanism interacts with the aircraft undercarriage and is configured to turn the undercarriage wheels relative to the longitudinal axis of the aircraft. The control device has an alignment unit which is connected to the control mechanism and which is configured to control the turning of the undercarriage wheels by means of the control mechanism during at least one part of the landing or take-off phase of the aircraft in such a way that the running direction of the undercarriage wheels is aligned in the direction of a fixed point which may be a corrected fixed point situated below a fixed point by a compensation angle.

12 Claims, 4 Drawing Sheets

(56) References Cited

U.S. PATENT DOCUMENTS

| | | | |
|---|---|---|---|
| 5,513,821 A * | 5/1996 | Ralph | 244/50 |
| 5,704,568 A * | 1/1998 | Watts | 244/50 |
| 5,738,331 A * | 4/1998 | Woolley | 244/82 |
| 6,722,610 B1 | 4/2004 | Rawdon et al. | |
| 2001/0052562 A1* | 12/2001 | Ishihara et al. | 244/175 |
| 2006/0195235 A1* | 8/2006 | Ishihara et al. | 701/16 |

* cited by examiner

CONTROL DEVICE FOR AIRCRAFT

FIELD OF THE INVENTION

The invention relates to a control device for aircraft, comprising at least one aircraft undercarriage arranged on an aircraft, which aircraft undercarriage has one or more undercarriage wheels, and comprising a control mechanism which interacts with the aircraft undercarriage and which is set up to turn the undercarriage wheels relative to the longitudinal axis of the aircraft.

BACKGROUND

In aviation, the take-off and landing phase of an aircraft is the most safety-critical part of a flight, because in particular large freight and passenger aircraft can take off or land only on surfaces (landing runway) correspondingly provided for the purpose, and owing to the vicinity of the aircraft to the ground in particular during the landing process, there is an increased risk of undesired ground contact and therefore an increased risk of an accident. During the take-off and landing phases, the movement directions of the aircraft relative to the ground (rolling on the take-off and landing runway, ground speed) or inertial speed vector must be aligned with the movement of the aircraft relative to the air (air speed or wind vector). In the event of crosswinds, this process leads to an increased risk of an accident.

In order that aircraft can land safely and smoothly even in the event of strong crosswinds, there are basically two different landing methods which pilots must be able to perform. These are firstly the de-crab method and secondly the sideslip method. In the de-crab method, the aircraft lands, aerodynamically in alignment with the wind, with a correction angle, that is to say the longitudinal axis of the aircraft (in general also the nose of the aircraft) is aligned with the wind direction, such that owing to the aircraft's airspeed and the correction angle, the drift resulting from the crosswind is compensated. Shortly before or shortly after touchdown, depending on the airline or operator, the pilot performs a maneuver to align the aircraft longitudinally with respect to the landing runway, in order that, after touchdown, the aircraft remains on the landing runway during the roll-out process or roll-out phase. Said maneuver requires a great deal of experience on the part of the pilots and can destabilize the roll-out process of the aircraft on the landing runway, wherein if the de-crab method is implemented incorrectly, considerable forces, in particular transverse forces, are exerted on the nose undercarriage or main undercarriage, as a result of which, to ensure the required level of safety, correspondingly robust dimensioning of the undercarriages is necessary, which results in a large undercarriage weight.

The sideslip method is a landing method for crosswind situations in which the pilot steers the aircraft in the direction of the wind by means of the aileron, such that the wing facing the wind is "left hanging". In order that the aircraft is not turned into the wind by the aileron deflection, the pilot counter-steers with the rudder and keeps the aircraft on course along the landing runway, such that, as a result, said state is also referred to as "crossed rudder". As a result of the fact that the wings which are inclined relative to the wind are left hanging, the drift owing to the crosswind is compensated, such that landing without a correction angle is possible. A disadvantage of said method is in particular the fact that, in the event of very strong crosswinds and therefore a very steeply hanging wing, there is the risk during touchdown of the aircraft on the landing runway that the hanging wing (or the engine mounted under the wing) makes contact with the ground, which can lead to severe accidents.

During a landing approach, hanging angles of greater than 5° must be avoided in order to prevent contact of the wing tips with the landing runway.

To compensate for the disadvantages of the de-crab method, specifically the increased transverse forces during touchdown, U.S. Pat. No. 6,722,610 B1 describes a special turnable aircraft undercarriage in which each individual wheel of the undercarriage or of the complete undercarriage system of the aircraft can be pivoted separately about the longitudinal axis (turning axis is the yaw axis) in order thereby to compensate the correction angle during landing in accordance with the de-crab method (so-called crab angle) by turning the wheels parallel to the movement direction of the aircraft over ground. For this purpose, on the basis of the actual movement direction of the aircraft over ground, the direction of the longitudinal axis, which in the de-crab method deviates from the movement direction, is determined, wherein the crab angle is determined from the difference between the actual movement direction of the aircraft over ground and the direction of the longitudinal axis. Each of the wheels of the aircraft is now turned through precisely this crab angle relative to the longitudinal axis, such that the running direction of the wheels is aligned parallel to or in the direction of the movement of the aircraft over ground.

The undercarriage is thus acted on by no forces other than those that would arise during a normal landing without the de-crab method, because the wheels are aligned in the movement direction of the aircraft. A disadvantage here is however in particular the fact that the touchdown point of the aircraft on the landing runway may shift as a result of spontaneous changes in wind direction or wind speed, such that the aircraft does not touch down exactly centrally on the landing runway, which ultimately increases the risk of an accident, which may in the worst case result in the aircraft leaving the landing runway.

SUMMARY

It is therefore an object of the present invention to specify a device by means of which an aircraft can be controlled safely during the take-off or landing phase even in the event of the de-crab method being implemented.

The object is achieved according to the invention by means of the control device of the type specified in the introduction in that the control unit has an alignment unit which is connected to the control mechanism and which is set up to control the turning of the undercarriage wheels by means of the control mechanism during the landing or take-off phase of the aircraft, in such a way that the running direction of the undercarriage wheels is aligned in the direction of a fixed point.

It is thus the case, for example during the de-crab method, in which the longitudinal axis of the aircraft is turned in the direction of the wind, that the wheels are not turned through the so-called crab angle into the direction of movement of the aircraft over ground, but rather that the running direction of the undercarriage wheels is aligned in the direction of a fixed point which may advantageously be assumed to be centrally at the end of the take-off or landing runway. Therefore, if the aircraft lands not one hundred percent centrally on the landing runway, the alignment of the undercarriage wheels causes the aircraft, shortly after touchdown, to be immediately guided in the direction of the assumed fixed point, such that the aircraft is situated centrally on the landing runway at the end of the roll-out process (before the start of the taxiway).

The fixed point may be a fixed point which is static relative to the landing runway or may preferably be a corrected fixed point situated below the fixed point, which is static relative to the landing runway, by a compensation angle.

To eliminate corresponding transverse forces which may arise for example in the case of two undercarriages formed as main undercarriages being arranged parallel to the aircraft longitudinal axis, the undercarriage wheels of said undercarriages are aligned toward the static or corrected fixed point such that all of the undercarriage wheels aligned toward the static or corrected fixed point are aligned parallel.

At the end of the roll-out process, when the aircraft, owing to the control device according to the invention, has arrived centrally on the landing runway at the fixed point despite the correction angle, it is particularly advantageous for the alignment unit to turn the wheels of the undercarriage system during the roll-out and/or braking process such that, at the end of the roll-out process, said wheels are aligned parallel to the longitudinal axis of the aircraft, that is to say the crab or correction angle maintained during the landing is reduced to the compensation angle during the roll-out by the corresponding turning of the aircraft longitudinal axis.

Within the context of the present invention, the landing phase is to be understood to mean the time period starting with the landing approach and ending with the end of the roll-out on the landing runway. This therefore includes the approach shortly before touchdown on the landing runway, the moment of touchdown and the roll-out and braking of the aircraft as far as the start of the taxiway.

During the stated landing phase, it is therefore very particularly advantageous for the control device to align the undercarriage wheels toward the fixed point, in particular toward the corrected fixed point situated below the uncorrected fixed point by the compensation angle, continuously such that even relatively small deviations which may arise as a result of changes in the wind and weather conditions can be immediately compensated.

To be able to retrofit the control device according to the invention easily even to relatively old aircraft types, it is particularly advantageous for the device to interact mechanically with a torque support, wherein the torque support is the mechanical connection between the aircraft and the lower part of the spring strut of the undercarriage. The spring strut, on the lower end of which the corresponding undercarriage wheels are arranged, is then turned on the torque support by means of the control mechanism such that the running direction of the undercarriage wheels pivots relative to the longitudinal axis of the aircraft. In this advantageous embodiment, therefore, all of the undercarriage wheels arranged on one spring strut are turned jointly together with said spring strut. This also encompasses the possibility of the turning of the complete wheel set with one part of the spring strut relative to the remaining part of the spring strut. Also conceivable is the turning of individual undercarriage wheels relative to their respective suspension.

In order to guide the aircraft in the direction of the fixed point, or of the corrected fixed point situated below the uncorrected fixed point by the compensation angle, immediately after the touchdown of the undercarriage wheels on the landing runway, the alignment unit is designed to determine the position of the fixed point relative to the longitudinal axis of the aircraft. This is particularly advantageous if, owing to a strong crosswind, the aircraft seeks to land with a correction angle and therefore the movement direction differs from the direction of the longitudinal axis. The alignment unit thus determines the angle between the longitudinal axis of the aircraft and the direction of the fixed point, such that as a function of said relative position of the fixed point, the undercarriage wheels can be correspondingly turned and aligned toward the fixed point or the corrected fixed point situated below the uncorrected fixed point by the compensation angle.

It is very particularly advantageous here for the control device to have a signal detection device by means of which an electromagnetic signal, which marks the fixed point toward which the wheels are to be aligned, can be detected. Such an electromagnetic signal may for example be the signal of the "Instrument Landing System" (ILS), wherein the emitter of the ILS signal is situated on the center line beyond the landing runway and continuously marks the center of the landing runway. As a function of said electromagnetic signals which are emitted by the ILS, it is thus possible to determine the position of the fixed point, such that the undercarriage wheels can be correspondingly aligned toward the fixed point or the corrected fixed point situated below the uncorrected fixed point by a compensation angle.

Furthermore, it is also conceivable for the control device to have a highly accurate position determining unit by means of which the position of the aircraft can be determined with high accuracy. Such a highly accurate position determining system may for example be a D-GPS system in conjunction with an inertial measurement system which detects corresponding acceleration forces and can thus detect the alignment of the longitudinal axis of the aircraft. It is thereby likewise possible to determine the position of the fixed point, the position of which can be indicated for example by a highly accurate GPS position, purely mathematically.

It is however also conceivable for the alignment unit to align all of the undercarriage wheels of the complete undercarriage system of the aircraft (nose undercarriage and main undercarriage) in the direction of the fixed point or of the corrected fixed point situated below the uncorrected fixed point by the compensation angle, and therefore every undercarriage wheel participates in the guidance in the direction of the fixed point. Here, the nose undercarriage must self-evidently be designed such that it can withstand the corresponding transverse forces without damage.

BRIEF DESCRIPTION OF THE DRAWINGS

The invention will be explained by way of example on the basis of the appended drawings, in which.

DETAILED DESCRIPTION

Figure 1:
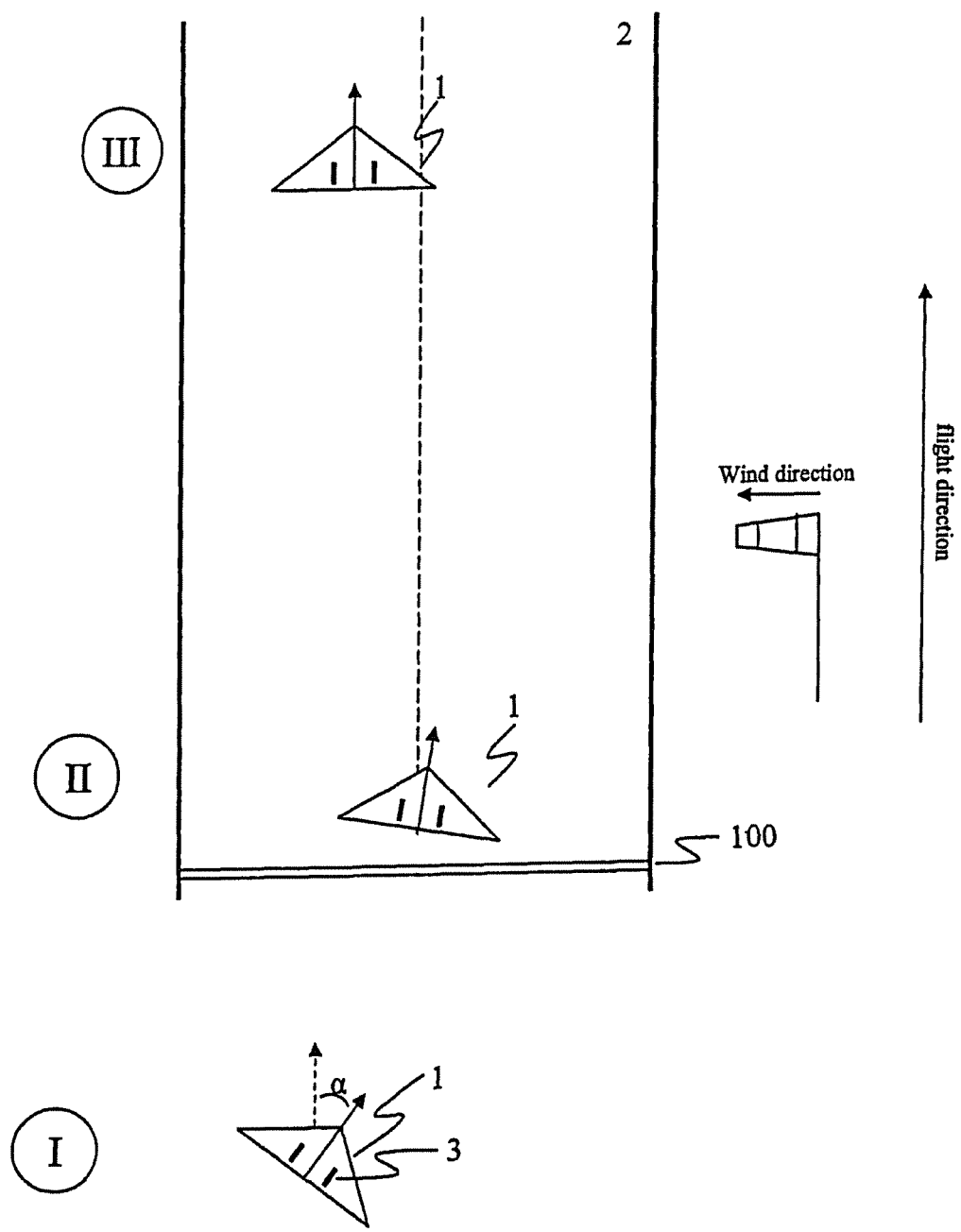
FIG. 1 is a schematic illustration of a landing in accordance with the de-crab method (prior art)

FIG. 1 schematically shows a landing in accordance with the de-crab method, such as is well known from the prior art. Here, for the sake of simplicity, the landing phase has been divided into three subsections I, II and III, wherein I is the approach phase to the landing runway threshold 100, II is the phase shortly before or shortly after touchdown of the aircraft 1 on the landing runway 2, and III denotes the roll-out phase of the aircraft 1 to the end of the landing runway and the start of the taxiway.

As can be seen in FIG. 1, the landing takes place in a very strong crosswind, wherein in aeronautical practice a landing is only referred to as a crosswind landing at a wind strength of approximately 10 to 25 knots (approximately 18 to 46 km/h).

Owing to the crosswind, which in the present example blows from right to left, the pilot cannot approach the landing runway in a normal alignment, because otherwise the aircraft 1 would be blown away from the runway by the crosswind. For this reason, the aircraft is turned in the direction of the wind already in the approach phase I, in order thereby to compensate for the drift owing to the crosswind. Said correction angle, also referred to as the crab angle α, is determined here from the relationship of flying speed relative to the air, flight direction, wind direction and wind strength. In the present example of FIG. 1, the crab angle is for example approximately 45 degrees, such that the crosswind, which is incident at exactly 90 degrees, and the resulting drift are compensated. The vectorial addition of the flying speed vector relative to the air plus the wind vector relative to the ground yields the flying speed vector relative to the ground. That is to say, for a given magnitude of approach speed relative to the air, the direction of the flying speed relative to the air must be selected so as to yield, together with the wind vector, the desired flight direction over ground. As can also be seen in this example, all of the undercarriage wheels 3 of the aircraft 1 are aligned rigidly and thus parallel to the longitudinal axis of the aircraft 1.

Shortly before the touchdown of the aircraft 1 on the landing runway 2 in phase II, the aircraft must be aligned parallel to the flight direction over ground (track), or parallel to the landing runway, again in order to avoid unnecessarily high transverse forces on the undercarriage wheels 3. This is because, if the aircraft 1 were to touch down on the landing runway at the correction angle α, the movement direction and the displacement of the longitudinal axis by the angle α would result in high transverse forces on the undercarriage wheels, which would lead to extreme loading on the undercarriage and extreme lateral acceleration being exerted on the passengers. For this reason, it is extremely important for the aircraft to be turned parallel to the flight direction over ground, and for the correction angle α to thus be reduced toward 0, shortly before touchdown. In aeronautical practice, this is the most critical moment during a crosswind landing.

The touchdown in phase II is followed by the roll-out phase III in which the aircraft is braked down to the restricted speed for the taxiway.

As can be clearly seen in the example of FIG. 1, owing to the prevailing crosswind, it is not always possible to set the aircraft down exactly on the center of the landing runway, which could under some circumstances constitute a safety risk.

Figure 2:
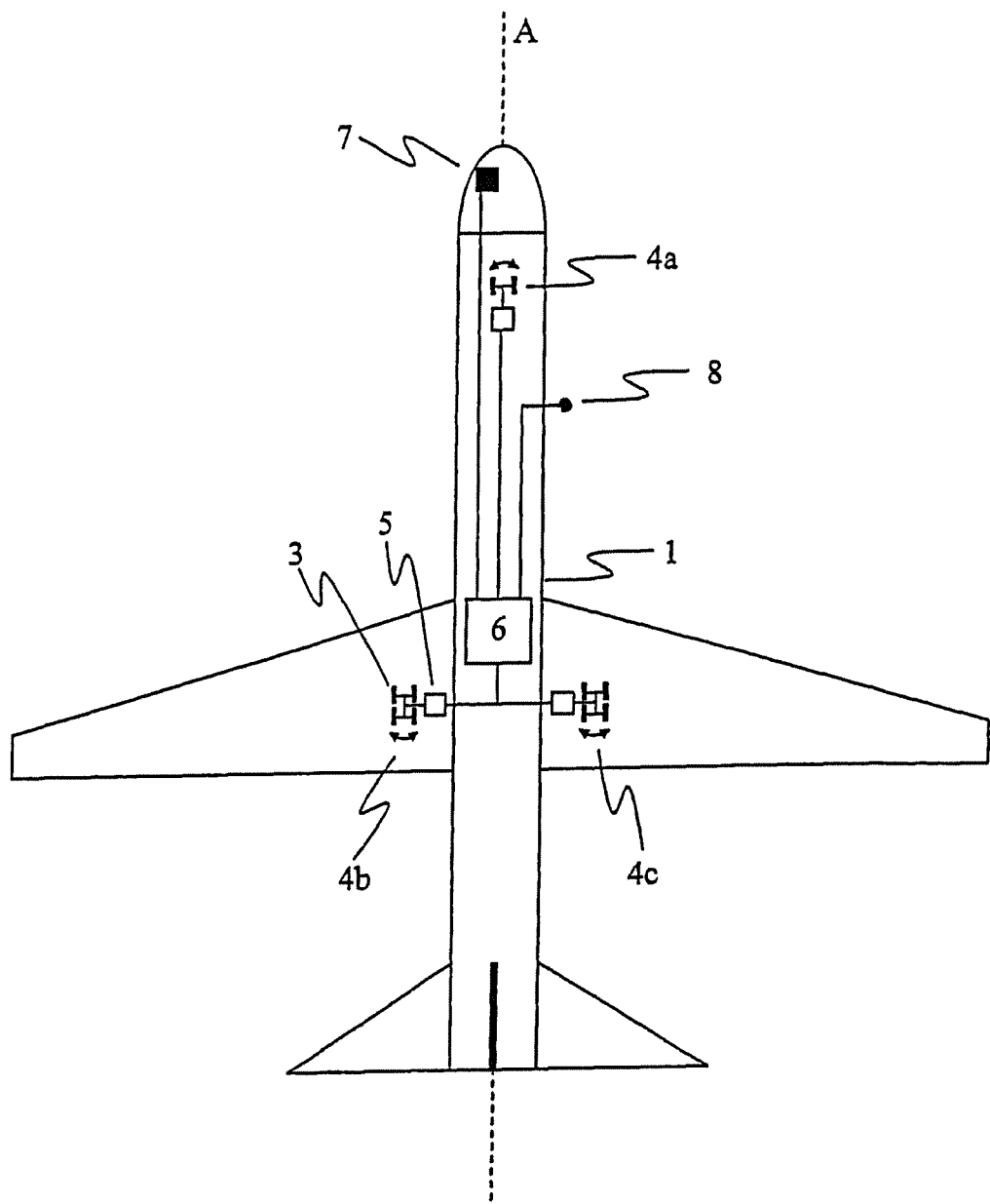
FIG. 2 is a schematic illustration of a block circuit diagram of the present control device.

FIG. 2 schematically shows a block circuit diagram of the present control device, by means of which the aircraft 1 after landing on the landing runway, can be correspondingly guided onto the center of the landing runway. The aircraft 1 has a nose undercarriage 4a and a rear undercarriage 4b, 4c, wherein one or more undercarriage wheels 3 are arranged on each undercarriage 4a, 4b, 4c. Here, the undercarriages 4a, 4b, 4c are connected to a control mechanism 5 by means of which the undercarriages 4a, 4b, 4c can be turned, that is to say the running direction of the undercarriage wheels 3 is pivoted or turned relative to the longitudinal axis A.

Here, the control mechanism 5 may be for example an actuator which is arranged above the spring strut on the torque support and which is mechanically connected to the torque support such that it turns the entire spring strut of the corresponding undercarriage 4a, 4b, 4c, together with the undercarriage wheels 3 arranged on the respective undercarriage 4a, 4b, 4c, relative to the longitudinal axis A of the aircraft 1. Here, the actuator may be a mechanical actuator, for example an electric motor, or else may be a hydraulic or similarly mounted actuator. The actuators may however also be arranged such that they can turn only the wheel set as a whole or single wheels individually.

The control mechanisms 5 are furthermore connected to the alignment unit 6 which implements the control of the turning of the undercarriage wheels 3 or undercarriages 4a, 4b, 4c by means of the control mechanism 5. For this purpose, the control mechanisms 5 are activated correspondingly by the alignment unit 6 and align the running direction of the undercarriage wheels 3 correspondingly toward the fixed point or a corrected fixed point situated below the uncorrected fixed point by the compensation angle.

To determine the fixed point, the aircraft furthermore has a signal detection device 7 which receives an electromagnetic signal emitted by an emitter (8, FIG. 3), for example the so-called localization signal of the ILS, and thus determines the position of the fixed point as a function of the detected electromagnetic signal. The localization signal of the ILS signal is a guide signal in the horizontal plane, which guide signal is emitted by an emitter (8, FIG. 3) arranged centrally beyond the end of the landing runway 2. The localization signal of the ILS thus continuously marks the center line of the landing runway 2. Since said localization signal of the ILS is provided at virtually every airport and every landing runway, it is possible here for the fixed point which is assumed to be centrally at the end of the landing runway to be determined using relatively simple means.

Another possibility for being able to determine the position of the fixed point consists in determining the position of the aircraft 1 with high accuracy by means of a position determining unit 8. Suitable for this purpose is for example D-GPS, which can determine the position accurately to within a few centimeters. With knowledge of the GPS coordinates of the fixed point of the corresponding landing runway 2 and the correction angle α, that is to say with the alignment of the aircraft relative to its actual movement direction, it is then possible to calculate the position of the fixed point relative to the aircraft 1 and its longitudinal axis A, such that as a function of said relative position, the alignment unit 6 can correspondingly activate the control mechanisms 5 in order thereby to align the undercarriages 4a, 4b, 4c and the undercarriage wheels 3 arranged thereon correspondingly toward the fixed point or a corrected fixed point situated below the uncorrected fixed point by the compensation angle.

Finally, the alignment unit 6 is set up such that, as a function of the alignment of the longitudinal axis A of the aircraft 1, which may differ from the movement direction of the aircraft 1 over ground owing to a correction angle α which may for example be present, said alignment unit determines the position of the fixed point relative to said longitudinal axis A, in order thereby to align the undercarriage wheels 3 correspondingly toward said fixed point or a corrected fixed point situated below the uncorrected fixed point by a compensation angle. For this purpose, the undercarriage wheels 3 are pivoted relative to the longitudinal axis A of the aircraft 1.

Figure 3:
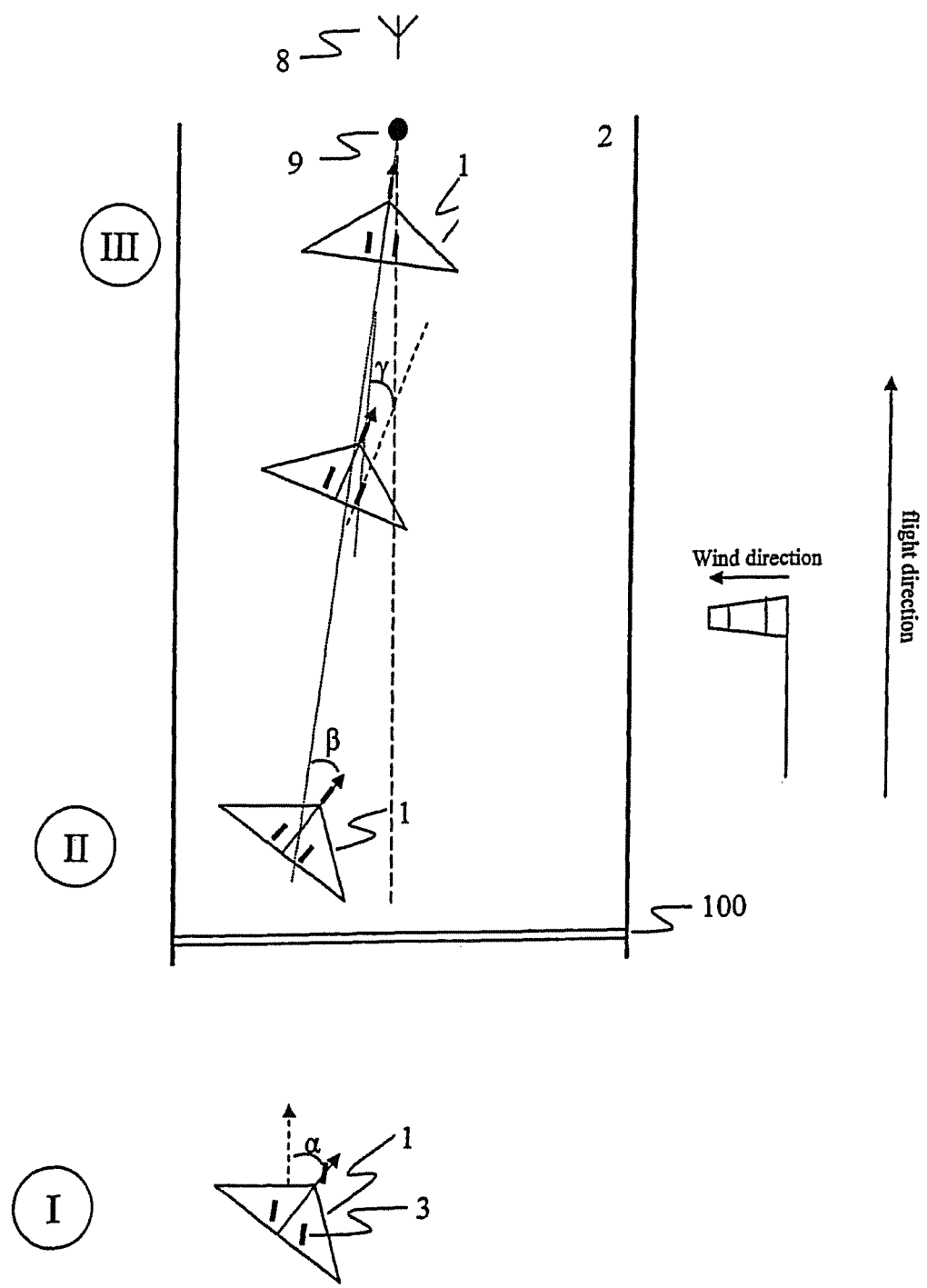
FIGS. 3 & 4 are schematic illustrations of a landing by means of the present control device.

FIG. 3 schematically shows the landing of an aircraft 1 by means of the present control device. The landing phases I, II and III already illustrated in FIG. 1 are maintained here. As can be seen, the approach to the landing runway 2 takes place with a crosswind, such that the aircraft has a corresponding correction angle or crab angle α in order to compensate the drift resulting from the crosswind. Here, the undercarriage wheels 3 arranged on the aircraft are aligned toward the corrected fixed point situated below the fixed point 9 (which is situated centrally at the end of the landing runway 2) by a compensation angle. Since the system continuously determines the position of the fixed point 9 in relation to the longitudinal axis A of the aircraft 1, the undercarriage wheels 3 are also realigned continuously toward said corrected fixed point situated below the fixed point 9 by a compensation angle, such that said undercarriage wheels are aligned toward said corrected fixed point situated below the fixed point 9 by the compensation angle throughout the entire landing phase. Here, the alignment of the undercarriage wheels 3 toward the corrected fixed point situated below the fixed point 9 by the compensation angle is performed already during the approach phase I.

When the aircraft now touches down on the landing runway 2 past the landing runway threshold 100 in phase II, the guidance of the aircraft 1 in the direction of the fixed point 9 begins immediately, because the undercarriage wheels are already aligned toward the corrected fixed point situated below the fixed point 9 by a compensation angle. It can be seen here that the aircraft wheels 3 are not aligned parallel to the landing runway 2 or to the movement direction of the aircraft 1 over ground, such that in particular at the moment of touchdown of the aircraft 1, corresponding (albeit small) transverse forces act on the main undercarriage.

Now, when the aircraft 1 has fully touched down, the braking and roll-out processes take place in phase III, wherein owing to the alignment of the undercarriage wheels in the direction of the corrected fixed point situated below the fixed point 9 by a compensation angle, the aircraft 1 is situated centrally on the center of the landing runway (center line) at the end of the roll-out process and before the start of the taxiway. Here, the alignment unit 6 as shown in Figure has been set up so as to turn the undercarriage wheels by means of the control mechanism 5 such that, at the end of the roll-out process III, the aircraft is not only situated in the center of the landing runway but rather the aircraft 1 is also aligned parallel to the landing runway and all the undercarriage wheels are likewise aligned parallel to the landing runway 2 (FIG. 4).

The control device according to the invention thus contributes significantly to safety during the landing and take-off phase of an aircraft.

Figure 4:
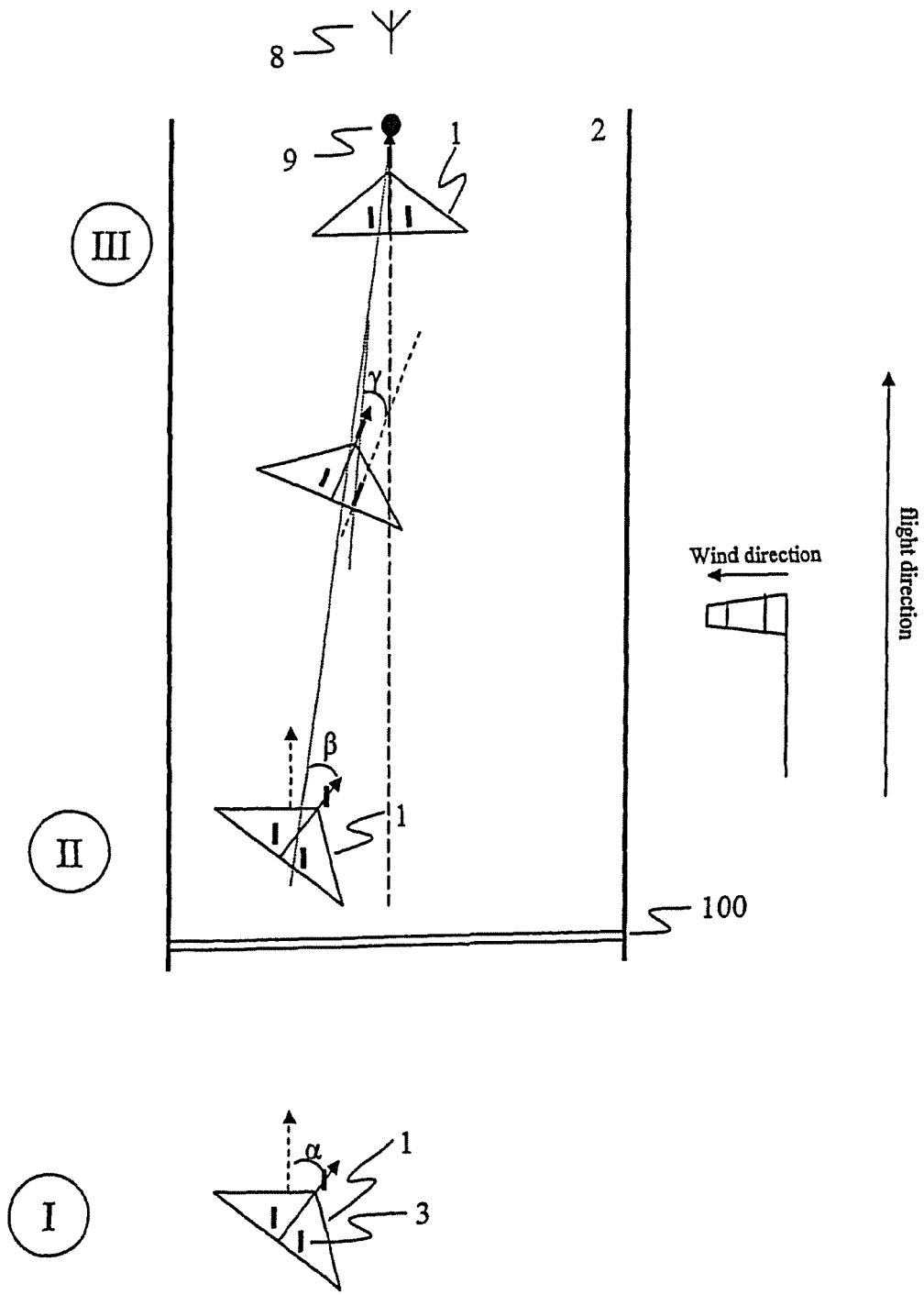

FIG. 4 likewise schematically shows a landing process by means of the present control device, but the undercarriage wheels 3 are aligned toward the corrected fixed point situated below the fixed point 9 by a compensation angle only after the touchdown in phase II. In the approach phase I, the undercarriage wheels 3 are aligned, owing to the correction angle α, in the movement direction of the aircraft 1 over ground, such that during the touchdown of the aircraft 1 on the landing runway threshold 100 in phase II, no critical transverse forces are exerted on the undercarriage.

Shortly after the touchdown in phase II, however, the undercarriage wheels 3 are then aligned toward the corrected fixed point situated below the fixed point 9 by a compensation angle, such that the aircraft is then guided in the direction of the corrected fixed point situated below the fixed point 9 by a compensation angle, and is thus guided in the direction of the center of the landing runway. The transverse forces or yaw forces generated here are lower than those generated during the touchdown of the aircraft in phase II if the undercarriage wheels are aligned toward the corrected fixed point situated below the fixed point 9 by a compensation angle.

At the end of the roll-out process III, the aircraft 1 is then situated in the center of the landing runway, wherein both the aircraft and also the undercarriage wheels are aligned parallel to the landing runway 2.

It is for example conceivable here that, during the guidance of the aircraft toward the corrected fixed point situated below the fixed point 9 by a compensation angle, one or more of the undercarriage wheels 3 begins to slip owing to the poor runway conditions, resulting in a transition from static friction to sliding friction. At this critical moment, the roll-out phase III then becomes safety-critical because the aircraft 1 is unstable. To eliminate this state again, it is conceivable for the undercarriage wheels 3 to be steered briefly into the direction of sliding, such that the sliding wheels can be returned from sliding friction to static friction in order then to resume the guidance of the aircraft in the direction of the fixed point 9. It is however also conceivable for yaw moments to be generated through asymmetrical braking of the undercarriage wheels 3, which yaw moments can be utilized for guiding the aircraft, for example toward the corrected fixed point situated below the fixed point 9 by a compensation angle.

All control maneuvers are, if necessary, assisted by suitable aileron and rudder inputs.

The invention claimed is:

1. A control device for an aircraft, comprising:
   one or more control mechanisms which interact with one or more undercarriages of the aircraft and which control turning of a plurality of undercarriage wheels relative to a longitudinal axis of the aircraft; and
   an alignment unit connected to the one or more control mechanisms, wherein the alignment unit is configured to receive position information of a fixed point along a centerline of a runway and, with the one or more control mechanisms, to turn the plurality of undercarriage wheels during at least one part of a landing or take-off so as to align a running direction of one wheel of the plurality of undercarriage wheels in a direction of the fixed point and align a remainder of the plurality of undercarriage wheels of said one or more undercarriages parallel to each other,
   wherein the alignment unit is configured to determine a position of the fixed point relative to the longitudinal axis of the aircraft, and is configured to turn the one wheel of the plurality of undercarriage wheels with the one or more control mechanisms as a function of a determined relative position of the fixed point.

2. The control device according to claim 1, wherein at least one of the one or more aircraft undercarriages has at least one spring strut, on the lower end of which one or more undercarriage wheels of the plurality of undercarriage wheels are arranged and which are mechanically connected to the aircraft via a torque support, and wherein a control mechanism of the one or more control mechanisms interacts mechanically with the torque support such that the at least one spring strut is turned as a result of turning of the torque support, and the running directions of the one or more undercarriage wheels arranged on the spring strut are pivoted relative to the longitudinal axis of the aircraft.

3. The control device according to claim 1, wherein the alignment unit is configured to align the one wheel of the plurality of undercarriage wheels in the direction of the fixed point continuously throughout the landing or take-off.

4. The control device according to claim 1, further comprising a signal detection device which detects an electromagnetic signal (ILS) which marks the fixed point, and wherein the control device is configured to determine a position of the fixed point as a function of the detected electromagnetic signal (ILS).

5. The control device according to claim 1, further comprising a position determining unit which determines a position of the aircraft, and wherein the alignment unit is configured to determine a position of the fixed point as a function of the determined position of the aircraft.

6. The control device according to claim 1, wherein the one or more control mechanisms are configured to align the one wheel of the plurality of undercarriage wheels through a turn angle relative to the aircraft longitudinal axis in a direction of the aircraft movement over ground in the direction of the fixed point, wherein configuration of the control device is such that alignment of the one wheel of the plurality of undercarriage wheels is performed with a reduction by a corrective angle with respect to the fixed point in order to compensate for a wind force acting laterally on the aircraft during braking and roll-out.

7. The control device according to claim 1, wherein the alignment unit is configured to turn the plurality of undercarriage wheels with the one or more control mechanisms after touchdown of the aircraft such that the longitudinal axis of the aircraft is aligned parallel to the plurality of undercarriage wheels during roll-out.

8. The control device according to claim 1, wherein the alignment unit is configured such that, after touchdown of the aircraft, the alignment unit moves a center of gravity of the aircraft in a controlled manner in a direction of a center of the run-way.

9. An aircraft undercarriage, comprising:
one or more control mechanisms that turn a plurality of undercarriage wheels which are arranged on the aircraft undercarriage, wherein said one or more control mechanisms control turning of the plurality of undercarriage wheels relative to a longitudinal axis of the aircraft; and
a control device, said control device comprising:
an alignment unit connected to the one or more control mechanisms, wherein the alignment unit is configured to receive position information of a fixed point along a centerline of a runway and, with the one or more control mechanisms, to turn the plurality of undercarriage wheels during at least one part of a landing or take-off so as to align a running direction of one wheel of the plurality of undercarriage wheels in a direction of the fixed point and align a remainder of the plurality of undercarriage wheels of said one or more undercarriages parallel to each other,
wherein the alignment unit is configured to determine a position of the fixed point relative to the longitudinal axis of the aircraft and is furthermore configured to turn the one wheel of the plurality of undercarriage wheels with the one or more control mechanisms as a function of a determined relative position of the fixed point.

10. A method of steering an aircraft during a take-off or landing, comprising steps of:
receiving in an alignment unit of the aircraft position information of a fixed point along a centerline of a runway;
determining a position of the fixed point relative to a longitudinal axis of the aircraft;
aligning a running direction of at least one wheel of a plurality of undercarriage wheels of the aircraft in a direction of the fixed point by turning the at least one wheel of the plurality of undercarriage wheels with one or more control mechanisms with which the alignment unit is connected, the turning of the at least one wheel being a function of the determined relative position of the fixed point; and
aligning a remainder of the plurality of undercarriage wheels of the aircraft parallel to each other.

11. The control device according to claim 1, wherein the fixed point is situated at the end of the runway opposite the aircraft at a start of the landing or take-off.

12. The control device according to claim 1, wherein the alignment unit is further configured to
turn the running direction of the one wheel in the direction of the fixed point during a landing before the aircraft touches down, and
continuously align the running direction of the one wheel in the direction of the fixed point throughout the landing phase including roll-out.

* * * * *